(12) United States Patent
Bahar et al.

(10) Patent No.: US 12,006,578 B2
(45) Date of Patent: Jun. 11, 2024

(54) ELECTROCHEMICAL OXYGEN PUMPS UTILIZING AN ANION CONDUCTING POLYMER

(71) Applicant: Xergy Inc., Harrington, DE (US)

(72) Inventors: Bamdad Bahar, Georgetown, DE (US); Zhefei Li, Felton, DE (US); Richard Sherrer, Landing, NJ (US); Jacob Zerby, Harbeson, DE (US)

(73) Assignee: FFI Ionix IP, Inc., Wilmington, DE (US)

( * ) Notice: Subject to any disclaimer, the term of this patent is extended or adjusted under 35 U.S.C. 154(b) by 0 days.

(21) Appl. No.: 15/918,945

(22) Filed: Mar. 12, 2018

(65) Prior Publication Data
US 2018/0202054 A1    Jul. 19, 2018

Related U.S. Application Data

(63) Continuation-in-part of application No. 15/800,398, filed on Nov. 1, 2017, now Pat. No. 10,890,344, which is a continuation-in-part of application No. PCT/US2016/063699, filed on Nov. 23, 2016.

(60) Provisional application No. 62/469,801, filed on Mar. 10, 2017, provisional application No. 62/416,072, filed on Nov. 1, 2016, provisional application No.
(Continued)

(51) Int. Cl.
| | |
|---|---|
| *C25B 1/04* | (2021.01) |
| *B01D 3/14* | (2006.01) |
| *B01D 53/32* | (2006.01) |
| *C25B 11/00* | (2021.01) |
| *B01D 53/047* | (2006.01) |
| *B01D 53/22* | (2006.01) |

(52) U.S. Cl.
CPC .............. *C25B 1/04* (2013.01); *B01D 53/326* (2013.01); *C25B 11/00* (2013.01); *B01D 3/14* (2013.01); *B01D 53/047* (2013.01); *B01D 53/22* (2013.01); *B01D 2257/104* (2013.01); *Y02E 60/36* (2013.01)

(58) Field of Classification Search
CPC ................................ C25B 1/06; B01D 53/326
See application file for complete search history.

(56) References Cited

U.S. PATENT DOCUMENTS

| | | | | |
|---|---|---|---|---|
| 4,414,090 A | * | 11/1983 | D'Agostino | .......... C08J 5/2243 |
| | | | | 204/252 |
| 2001/0030127 A1* | | 10/2001 | Li | ........................ B01D 53/228 |
| | | | | 204/252 |

(Continued)

OTHER PUBLICATIONS

Marino et al. Alkaline Stability of Quaternary Ammonium Cations for Alkaline Fuel Cell Membranes and Ionic Liquids. ChemSusChem. 2015. vol. 8. pp. 513-523. (Year: 2015).*

(Continued)

*Primary Examiner* — Harry D Wilkins, III
(74) *Attorney, Agent, or Firm* — Invention To Patent Services; Alex Hobson

(57) ABSTRACT

An electrochemical oxygen pump moves or pumps oxygen molecules with a unique anion conducting layer comprising an anion conducting polymer. These pumps can either be used as high precision oxygen flow meters or as oxygen filters. The system can be plumbed to have air as the inlet and the pump will selectively pump oxygen out, offering another way to remove oxygen from the air, along with distillation or pressure swing absorption.

10 Claims, 1 Drawing Sheet

Related U.S. Application Data

62/385,175, filed on Sep. 8, 2016, provisional application No. 62/373,329, filed on Aug. 10, 2016, provisional application No. 62/353,545, filed on Jun. 22, 2016, provisional application No. 62/300,074, filed on Feb. 26, 2016, provisional application No. 62/258,945, filed on Nov. 23, 2015.

(56) References Cited

U.S. PATENT DOCUMENTS

| | | | | |
|---|---|---|---|---|
| 2006/0199054 | A9* | 9/2006 | Gallagher | H01M 8/04179 429/434 |
| 2012/0241315 | A1* | 9/2012 | Yoshinaga | F25D 17/042 204/262 |
| 2016/0222527 | A1* | 8/2016 | Bisselink | C02F 1/4672 |
| 2017/0183789 | A1* | 6/2017 | Matthews | C25B 13/08 |

OTHER PUBLICATIONS

Liu et al, A facile strategy for the synthesis of guanidinium-functionalized polymer as alkaline anion exchange membrane with improved alkaline stability, Journal of Membrane Science, vol. 453, Mar. 2014, pp. 52-60 (Year: 2014).*

Qiu et al, Alkaline imidazolium- and quaternary ammonium-functionalized anion exchange membranes for alkaline fuel cell applications, Journal of Materials Chemistry, vol. 22, No. 48, Dec. 2012, pp. 1040-1045 (Year: 2012).*

Ran et al, Development of imidazolium-type alkaline anion exchange membranes for fuel cell application, Journal of Membrane Science, vol. 415-416, Oct. 2012, pp. 242-249 (Year: 2012).*

Wang et al, Novel Hydroxide-Conducting Polyelectrolyte Composed of an Poly(arylene ether sulfone) Containing Pendant Quaternary Guanidinium Groups for Alkaline Fuel Cell Applications, Macromolecules, vol. 43, No. 8, Mar. 2010, pp. 3890-3896 (Year: 2010).*

* cited by examiner

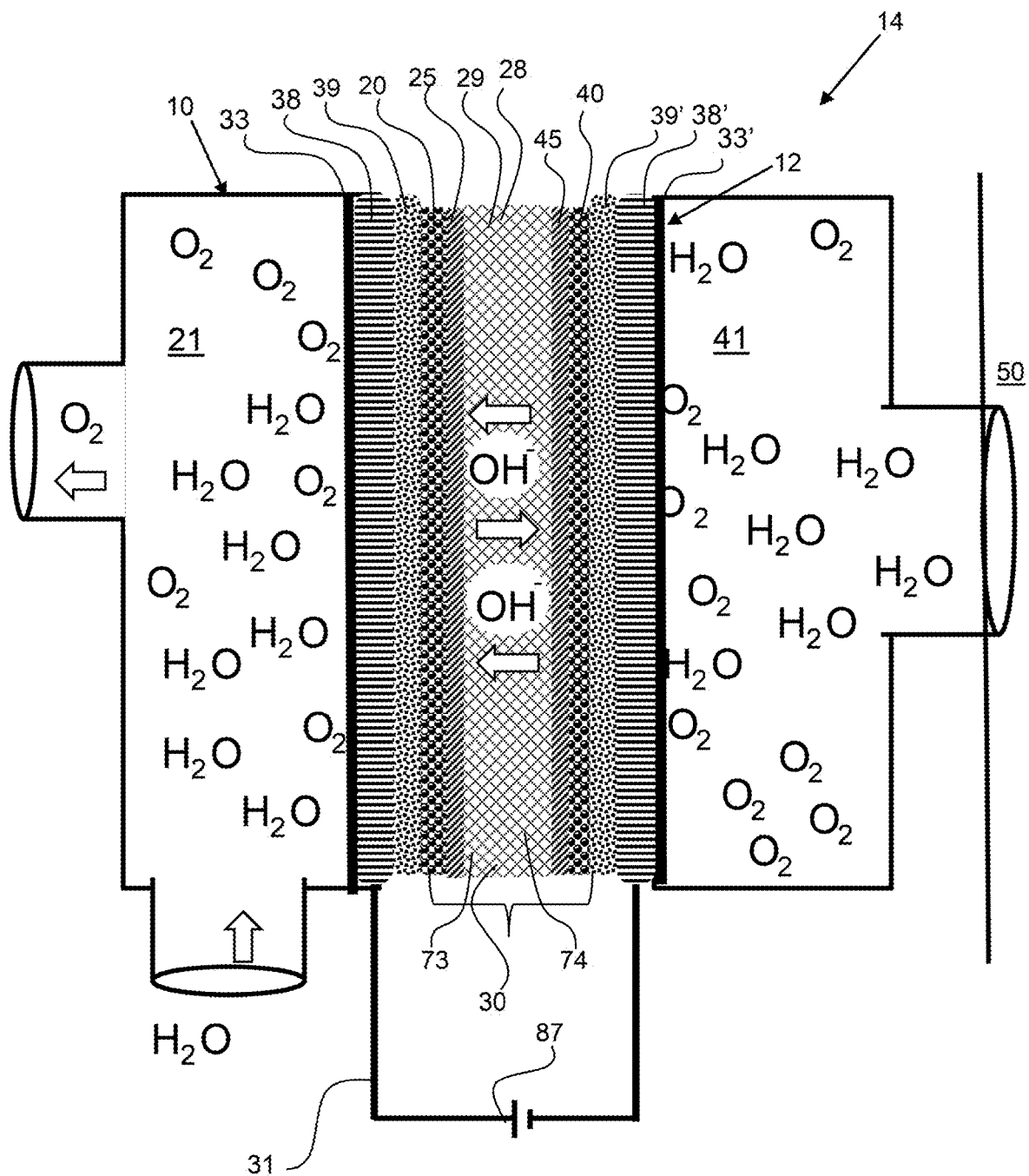

ELECTROCHEMICAL OXYGEN PUMPS UTILIZING AN ANION CONDUCTING POLYMER

CROSS REFERENCE TO RELATED APPLICATIONS

This application is a continuation in part of patent application Ser. No. 15/800,398, filed on Nov. 1, 2017, which is a national stage entry of International Patent Application no. PCT/US2016/063699, filed on Nov. 23, 2016, which claims the benefit of U.S. provisional patent application No. 62/258,945, filed on Nov. 23, 2015, U.S. provisional patent application No. 62/300,074, filed on Feb. 26, 2016, U.S. provisional patent application No. 62/353,545, filed on Jun. 22, 2016, U.S. provisional patent application No. 62/373,329, filed on Aug. 10, 2016 and U.S. provisional patent application No. 62/385,175, filed on Sep. 8, 2016; and application Ser. No. 15/800,398 claims the benefit of priority to U.S. provisional application No. 62/416,072, filed on Nov. 1, 2016; and this application also claims the benefit of priority to U.S. provisional patent application No. 62/469,801, filed on Mar. 10, 2017 and entitled Electrochemical Oxygen Pumps Using Anion Exchange Membrane, the entirety of all application listed above are hereby incorporated by reference herein.

BACKGROUND OF THE INVENTION

Field of the Invention

The invention is directed to electrochemical oxygen pumps directly moving oxygen molecules with a unique anion conducting layer comprising an anion conducting polymer.

Background

Electrochemical pumps or compressors use direct current (DC) to control the movement of gaseous molecules across an ion conducting membrane or ion exchange membrane (IEM). There are previous inventions that move water, hydrogen, carbon dioxide, ammonia, and oxygen by flowing current into an electrochemical cell to ionize the gas and force the ions to recombine on the other side of the cell.

Previous work, however, focuses on using proton exchange membranes (PEMs) to move gases, excluding carbon dioxide and ammonia, but anion conducting layers or anion exchange membranes (AEMs) are also a viable route for transporting oxygen. AEMs are fundamentally different from PEMs because, instead of allowing protons to conduct across the membrane like PEMs, AEMs conduct hydroxide ions across.

The pump is constructed with electrodes, membrane, catalyst, and flow channels as the working parts. The membrane will be an AEM, as previously stated. The electrodes are nodes for current to enter and exit the cell and are placed on the outside of the cell. The catalyst is sprayed onto the membrane and is present to improve the chemical kinetics of the system and allow the pump to function at room temperature. The flow channels act as "pipe" that direct the flow of oxygen into and out of the cell. Flow channels can either be etched into a piece of metal or drilled through metal.

These pumps can either be used as high precision oxygen flow meters or as oxygen filters. The system can be plumbed to have air as the inlet and the pump will selectively pump oxygen out, offering another way to remove oxygen from the air, along with distillation or pressure swing absorption.

SUMMARY OF THE INVENTION

The invention is directed to electrochemical oxygen pumps using anion exchange membranes or an anion conducting layer comprising an anion conducting polymer. In an exemplary embodiment, an electrochemical oxygen pump system comprises an ion conducting layer, a film layer on the membrane, and electrodes. The ion exchange membrane may be an anion exchange membrane or anion conducting layer as used herein. An exemplary film layer, coupled to the ion conducting layer, has the molecular structure of M or $MO_2$ where M is platinum, silver, iridium, ruthenium, nickel, or cobalt. The electrodes may be aluminum, 316 stainless steel or titanium and one or more of the electrodes may be coated or electroplated with gold or titanium nitride. In addition, an electrode may be coupled with a gas diffusion layer and an exemplary gas diffusion layer may comprise a carbon mesh, carbon paper, aluminum, copper, or titanium. An electrode may be configured on either side of the conducting layer. One electrode may act as an anode and the other may act as a cathode in the oxygen pumping system.

An electrochemical oxygen pump of the present invention may also comprise bipolar metal plates and these bipolar plates may be made of 316 stainless steel, titanium, or aluminum. An exemplary bipolar plate is coated or electroplated with gold or titanium nitride.

An exemplary electrochemical oxygen pumps comprises an ultra-thin anion conducting layer that passively transports water from the anode side to the cathode side. This anion conducting layer may comprise a polymer or a polymer having a backbone including, but not limited to polyether ketone, polystyrene, polyolefins, perfluoronated polyolefin, polyphenolene oxide, or polybiphenyl alkylene. The membrane and/or the polymer of the membrane, such as an anion conducting layer may have functional groups including, but not limited to, quaternary ammonium, imidazolium, pyridinium, or piperidine. An exemplary membrane has a thickness of between 10-50 microns and preferably less than 25 microns. An exemplary membrane may comprise a support material, such as a porous scaffold, such as a porous fluoropolymer, for example. The polymer of the membrane may be coated onto or imbibed into a support material. In an exemplary embodiment, an anion conducting polymer as described herein, is imbibed into a porous fluoropolymer membrane.

An exemplary anion conducting layer may consists of anion conducing polymer as described herein or may be a composite and comprises a support material. A support material may be used to increase the strength of the anion conducting polymer and may help to control the thickness of the anion conducting layer. A support material may be a polymeric material, such as an olefin including, but not limited to polyethylene, or may comprise a fluoropolymer. An exemplary fluoropolymer support material comprises polytetrafluoroethylene, such as expanded polytetrafluoroethylene, such as available from W. L. Gore and Associates Inc. Newark, DE. An exemplary support material is porous prior to combining with the anion conducting polymer and may have pores throughout the thickness of the support material. An exemplary support material is microporous, having pores with an average pore size, as determined by a coulter porometer, of no more than about 5 μm and preferably no more than 1 μm. An exemplary anion conducting layer may be very thin to reduce resistance and increase the flow of oxygen from the cathode to the anode and may be no more than about 50 μm, no more than about 30 μm, no more than about 25 μm, no more than about 20 μm, no more than about 15 μm and any thickness between and including the values provided.

Functional groups that are useful for anion conducing polymers may be alcohols, ethers, esters, aldehydes, ketones, carboxylic or amine groups. In the example provided, the functional group utilized was Quaternary Ammonium. These groups maybe associated with a polymer backbone. Typical backbones involve polymers with styrenic or benzene rings, or vinyl ether groups which may optionally be fluorinated for better chemical resistance. Further description of various functional groups are provided below:

Alcohols

Alcohols are functional groups characterized by the presence of an —OH group. Alcohols are classified as primary, secondary, or tertiary, based upon the number of carbon atoms connected to the carbon atom that bears the hydroxyl group. Due to the presence of an —OH group, alcohols can hydrogen bond. This leads to higher boiling points compared to their parent alkanes. Alcohols are polar in nature. This is attributed to the difference in electronegativity between the carbon and the oxygen atoms. In chemical reactions, alcohols often cannot leave the molecule on their own; to leave, they often become protonated to water, which is a better leaving group. Alcohols also can become deprotonated in the presence of a strong base. Alcohols are organic compounds in which the hydroxyl functional group (—OH) is bound to a carbon atom. Alcohols are an important class of molecules with many scientific, medical, and industrial uses.

The structure of an alcohol is similar to that of water, as it has a bent shape. This geometrical arrangement reflects the effect of electron repulsion and the increasing steric bulk of the substituents on the central oxygen atom. Like water, alcohols are polar, containing an unsymmetrical distribution of charge between the oxygen and hydrogen atoms. The high electronegativity of the oxygen compared to carbon leads to the shortening and strengthening of the —OH bond. The presence of the —OH groups allows for hydrogen bonding with other —OH groups, hydrogen atoms, and other molecules. Since alcohols are able to hydrogen bond, their boiling points are higher than those of their parent molecules. They often undergo deprotonation in the presence of a strong base. This weak acid behavior results in the formation in an alkoxide salt and a water molecule. Hydroxyl groups alone are not considered good leaving groups. Often, their participation in nucleophilic substitution reactions is instigated by the protonation of the oxygen atom, leading to the formation a water moiety—a better leaving group. Alcohols can react with carboxylic acids to form an ester, and they can be oxidized to aldehydes or carboxylic acids. Alcohols have many uses in our everyday world. They are found in beverages, antifreeze, antiseptics, and fuels. They can be used as preservatives for specimens in science, and they can be used in industry as reagents and solvents because they display an ability to dissolve both polar and non-polar substances.

Ethers

Ethers are a class of organic compounds characterized by an oxygen atom connected to two alkyl or aryl groups. Ethers have relatively low boiling points due to their inability to form hydrogen bonds with each other. Due to the electronegativity difference between the oxygen and carbon atoms of an ether, the molecule is slightly polar. Although they have low reactivity overall, the two lone pairs of electrons on the oxygen atom do afford the ether molecule some reactivity; the ether molecule is subject to reacting with strong acids and serves as a Lewis base. Although they resist undergoing hydrolysis, they are often cleaved by acids, which results in the formation of an alkyl halide and an alcohol. Ethers tend to form peroxides in the presence of oxygen or air. The general formula is R—O—O—R'. Ethers can serve as Lewis and Bronsted bases, serving to donate electrons in reactions, or accept protons. Ethers can be formed in the laboratory through the dehydration of alcohols (2R—OH→R—O—R+$H_2O$ at high temperature), nucleophilic displacement of alkyl halides by alkoxides (R—ONa+R'—X→R—O—R'+NaX), or electrophilic addition of alcohols to alkenes ($R_2C$=$CR_2$+R—OH→$R_2$CH—C(—O—R)—$R_2$).

Aldehydes and Ketones

Aldehydes and ketones are classes of organic compounds that contain a carbonyl (C=O) group. The carbonyl functional group is a carbon double bonded to an oxygen. Depending on the location of the carbonyl group, it is termed differently; ketones contain the carbonyl inside the compound and aldehydes contain the carbonyl at the end of the organic compound. Ketones and aldehydes can undergo keto-enol tautomerism. This refers to the equilibrium between the two possible tautomers. The interconversion of the two forms involves the movement of a proton and the shifting of bonding electrons. This equilibrium affords the compounds more reactivity. Ketones and aldehydes participate in a variety of reactions. They can undergo oxidation reactions, in which they become oxidized to the corresponding carboxylic acids. Due to the carbonyl group, ketones are polar and are able to interact with other compounds through hydrogen bonding; this hydrogen bond capability makes ketones more soluble in water than related methylene compounds. Ketones are not usually hydrogen bond donors, and they tend not to exhibit intermolecular attractions with other ketones. As a result, ketones are often more volatile than alcohols and carboxylic acids of comparable molecular weights. Ketones have alpha-hydrogens which participate in keto-enol tautomerism. In the presence of a strong base, enolate formation and subsequent deprotonation of the enolate will occur.

Aldehydes

An aldehyde is an organic compound that contains a carbonyl group with the central carbon bonded to a hydrogen and R group (R—CHO). Aldehydes differ from ketones in that the carbonyl is placed at the end of the carbon skeleton rather than between two carbon atoms of the backbone. Like ketones, aldehydes are $sp^2$ hybridized and can exist in the keto or enol tautomer. Aldehydes are named by dropping the suffix of the parent molecule, and adding the suffix "-al." For instance, a three-carbon chain with an aldehyde group on a terminal carbon would be propanol. If there are higher order functional groups on the compound, the prefix "oxo-" can be used to indicate which carbon atom is part of the aldehyde group. If the location of the aldehyde must be specified, a number can be used in between the parent chain and suffix, or at the beginning of the compound name. Both aldehydes and ketones exist in an equilibrium with their enol forms; the enol form is defined as an alkene with a hydroxyl group affixed to one of the carbon atoms composing the double bond. The keto form predominates at equilibrium for most ketones. However, the enol form is important for some reactions because the deprotonated enolate form is a strong nucleophile. The equilibrium is strongly thermodynamically driven, and at room temperature the keto form is favored. The interconversion can be catalyzed by the presence of either an acid or a base. Ketones and aldehydes can both be readily reduced to alcohols, usually in the presence of a strong reducing agent such as sodium borohydride. In the presence of strong oxidizing agents, they can be oxidized to carboxylic acids. As electrophiles, they are subject to attack by nucleophiles, meaning they participate in many nucleophilic addition reactions.

Carboxylic Acids

Carboxylic acids are organic acids that contain a carbon atom that participates in both a hydroxyl and a carbonyl functional group. Carboxylic acids are used as precursors to form other compounds such as esters, aldehydes, and ketones. Carboxylic acids can exhibit hydrogen bonding with themselves, especially in non-polar solvents; this leads to increased stabilization of the compounds and elevates their boiling points. Since they contain both hydroxyl and carbonyl functional groups, carboxylic acids participate in hydrogen bonding as both hydrogen acceptors and hydrogen donors. Carboxylic acids act as both hydrogen bond acceptors, due to the carbonyl group, and hydrogen bond donors, due to the hydroxyl group. As a result, they often participate in hydrogen bonding. Carboxylic acids usually exist as dimeric pairs in nonpolar media because of their tendency to "self-associate." This tendency to hydrogen bond gives them increased stability as well as higher boiling points relative to the acid in aqueous solution. Carboxylic acids are polar molecules; they tend to be soluble in water, but as the alkyl chain gets longer, their solubility decreases due to the increasing hydrophobic nature of the carbon chain. Carboxylic acids are characterized as weak acids, meaning that they do not fully dissociate to produce $H^+$ cations in a neutral aqueous solution.

Esters

Esters are functional groups produced from the condensation of an alcohol with a carboxylic acid and are named based on these components. Esters are a functional group commonly encountered in organic chemistry. They are characterized by a carbon bound to three other atoms: a single bond to a carbon, a double bond to an oxygen, and a single bond to an oxygen. The singly bound oxygen is bound to another carbon. Ester names are derived from the parent alcohol and the parent acid. While simple esters are often called by their common names, all esters can be named using the systematic IUPAC name, based on the name for the acid followed by the suffix "-oate." Esters react with nucleophiles at the carbonyl carbon. The carbonyl is weakly electrophilic but is attacked by strong nucleophiles. The C—H bonds adjacent to the carbonyl are weakly acidic but undergo deprotonation with strong bases. Esters are an important functional group in organic chemistry, and they are generally written RCOOR' or $RCO_2R'$. As usual, R and R' are both alkyl groups or groups initiating with carbon. Esters are derivative of carboxylic acids where the hydroxyl (OH) group has been replaced by an alkoxy (O—R) group. They are commonly synthesized from the condensation of a carboxylic acid with an alcohol:

RCO2H+R'OH→RCO2R'+H2ORCO2H+ R'OH→RCO2R'+H2O

Esters are ubiquitous. Most naturally occurring fats and oils are the fatty acid esters of glycerol. Esters are typically fragrant, and those with low enough molecular weights to be volatile are commonly used as perfumes and are found in essential oils and pheromones. Polymerized esters, or polyesters, are important plastics, with monomers linked by esteric units like this: $CO_2RCO_2RCO_2R$ . . . etc.

In the case of esters formed from common carboxylic acids, more colloquial terms are sometimes used. For example, ethanoic acid is more commonly known as acetic acid, and thus its esters contain "acetate" instead of "ethanoate" in their names. Other such substitutions include "formate" instead of "methanoate," "propionate" instead of "propanoate," and "butyrate" instead of "butanoate."

The chemical formulas of organic esters are typically written in the format of $RCO_2R'$, where R and R' are the hydrocarbon parts of the carboxylic acid and alcohol, respectively. For example, butyl acetate, systematically known as ethanoic acid, is derived from butanol and acetic acid and would be written $CH_3CO_2C_4H_9$. Alternative presentations are common, including BuOAc and $CH_3COOC_4H_9$. Cyclic esters are known as lactones.

Esters are more polar than ethers, but less so than alcohols. They participate in hydrogen bonds as hydrogen bond acceptors, but cannot act as hydrogen bond donors, unlike their parent alcohols and carboxylic acids. This ability to participate in hydrogen bonding confers some water-solubility, depending on the length of the alkyl chains attached. Since they have no hydrogens bonded to oxygens, as alcohols and carboxylic acids do, esters do not self-associate. Consequently, esters are more volatile than carboxylic acids of similar molecular weight. The C—H bonds adjacent to the carbonyl are weakly acidic, but undergo deprotonation with strong bases. This process is the one that usually initiates condensation reactions. The carbonyl oxygen is weakly basic (less so than in amides) but can form adducts with Lewis acids.

Amines

Amines are compounds characterized by the presence of a nitrogen atom, a lone pair of electrons, and three substituents. Due to the lone pair of electrons, amines are basic compounds. The basicity of the compound can be influenced by neighboring atoms, steric bulk, and the solubility of the corresponding cation to be formed. Amine compounds can hydrogen bond, which affords them solubility in water and elevated boiling points. The general structure of an amine is a nitrogen atom with a lone pair of electrons and three substituents. However, the nitrogen may bind to four substituents, leaving a positive charge on the nitrogen atom. These charged species can serve as intermediates for important reactions. The amine functional group contains a basic nitrogen atom with a lone pair of electrons. As such, the group is derivative of ammonia, in which one or more hydrogen atoms have been replaced by a carbon-containing substituent. Compounds with the nitrogen group attached to a carbonyl within the structure are referred to as amides, and they have the structure R—CO—NR'R". Amine groups bonded to an aromatic (conjugated cyclic) structure are known as aromatic amines. The aromatic structure effectively decreases the alkalinity of the amine, while the presence of the amine group significantly decreases the reactivity of the ring due to an electron donating effect. The prefix "amino-" or the suffix "-amine" is used when naming an amine compound. An organic compound with multiple amino groups is called a diamine, triamine, tetramine, etc.

Amines are able to hydrogen bond. As a result, the boiling points of these compounds are higher than those of the corresponding phosphines, but lower than those of the corresponding alcohols, which hydrogen bond to a stronger extent. Amines also display some solubility in water. However, the solubility decreases with an increase in carbon atoms, due to the increased hydrophobicity of the compound as the chain length increases. Aliphatic amines, which are amines connected to an alkyl chain, display solubility in organic polar solvents. Aromatic amines, which are amines that participate in a conjugated ring, donate their lone pair of electrons into the benzene ring, and thus their ability to engage in hydrogen bonding decreases. This results in a decrease in their solubility in water and high boiling points.

Amines of the type NHRR' and NR'R"R'" are chiral molecules and can undergo inversion. Since the barrier for inversion is quite low (~7 kcal/mol), these compounds cannot be resolved optically. Amines are bases, and their basicity depends on the electronic properties of the substituents (alkyl groups enhance the basicity; aryl groups diminish it), steric hindrance, and the degree of solvation of the protonated amine. In general, the effect of alkyl groups raises the energy of the lone pair of electrons, thus elevating the basicity. Thus, the basicity of an amine can be expected to increase with the number of alkyl groups on the amine. Additionally, the effect of the aromatic ring delocalizes the lone pair of electrons on nitrogen into the ring, resulting in decreased basicity. The solvation of protonated amines changes upon their conversion to ammonium compounds. Typically, salts of ammonium compounds exhibit the following order of solubility in water: primary ammonium ($RNH_3^+$)>secondary ammonium ($R_2NH_2^+$)>tertiary ammonium ($R_3NH^+$). Quaternary ammonium salts usually exhibit the lowest solubility of the series. They are also used for gas treatment, such as removing $CO_2$ from combustion gases As described in International Patent Application no. PCT/US2016/063699, an electrochemical cell comprising a membrane electrode assembly may be used to control the oxygen and/or humidity levels within an enclosure. An exemplary electrochemical oxygen pump system comprising an oxygen pumping electrochemical cell maybe employed in any of the embodiments described in International Patent Application no. PCT/US2016/063699.

The summary of the invention is provided as a general introduction to some of the embodiments of the invention and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

The FIGURE shows an exemplary electrochemical oxygen pump system comprising an electrochemical cell comprising a membrane electrode assembly.

The FIGURE represent an illustration of an embodiment of the present invention and is not to be construed as limiting the scope of the invention in any manner. Further, the FIGURE is not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein. The embodiments described are only for purposes of illustrating the present invention and should not be interpreted as limiting the scope of the invention. Other embodiments of the invention, and certain modifications, combinations, and improvements of the described embodiments, will occur to those skilled in the art and all such alternate embodiments, combinations, modifications, improvements are within the scope of the present invention.

Referring now to Equation 1, on the cathode side of the pump, the inlet oxygen and water combine with electrons to form hydroxide ions. These hydroxide ions then transport across the membrane to the anode side.

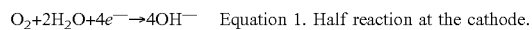

$$O_2 + 2H_2O + 4e^- \rightarrow 4OH^-$$ Equation 1. Half reaction at the cathode.

Referring now to Equation 2, on the anode side, the hydroxide decomposes back into water and oxygen, completing the cycle, and giving the pump a Nerst potential of zero volts.

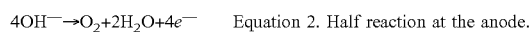

$$4OH^- \rightarrow O_2 + 2H_2O + 4e^-$$ Equation 2. Half reaction at the anode.

As shown in the FIGURE, an exemplary environment control system 10, comprises an electrochemical oxygen pump system 14 that utilizes an electrochemical cell 12 comprising a membrane electrode assembly 30 connected to a circuit 31 for delivery of power from a power source 87. Oxygen and water from the cathode side 41 react on the cathode 40 to produce hydroxide ions, $OH^-$. The hydroxide ions are transported across the ion conducting layer 28, an anion conducting layer 29, to the anode 20, wherein the hydroxides react to form oxygen and water on the anode side 21. A film layer 25, 45 is coupled to the anode and the cathode, respectively. The cathode 40 is in fluid communication with the enclosure 50 and therefore reduces the oxygen concentration of the enclosure. The electrochemical cell also includes a gas diffusion layer 39, 39', a flow field 38, 38' and a current collector 33, 33' configured on both the anode and cathode. The gas diffusion layer may comprise, consist essentially of or consist of carbon mesh, carbon paper, aluminum, copper, or titanium. The flow filed may comprise, consist essentially of or consist of 316 stainless steel, titanium, or aluminum 316 stainless steel, titanium, or aluminum.

The anion conducting layer may comprise, consist essentially of or consist of an anion conducting polymer having a backbone and wherein the backbone comprises at least one of: polyether ketone, polystyrene, polyolefins, perfluorinated polyolefin, polyphenolene oxide, or polybiphenyl alkylene. The anion conducting polymer has functional groups that may include quaternary ammonium, imidazolium, pyridinium, or piperidine. The anion conducting layer may consist essentially of the anion conducting polymer 73 or be a composite anion conducting layer and comprise a support material 74 and the anion conducting polymer 73. The anion conducting polymer may be imbibed into the support material, such as into the pores of the support material.

This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

It will be apparent to those skilled in the art that various modifications, combinations, and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. An electrochemical oxygen pumping system comprising:
   a) an electrochemical cell comprising:
      i) an anode on an anode side and having an anode film layer disposed thereon;
      ii) a cathode on a cathode side and having a cathode film layer disposed thereon;
      wherein both the anode film layer and the cathode film layer have the molecular structure $MO_2$ where M is selected from the group consisting of: platinum, silver, iridium, ruthenium, nickel, and cobalt;
      iii) an anion conducting layer configured between said anode and said cathode and comprising an anion conducting polymer;
      wherein the anion conducting polymer has functional groups;
      wherein the functional groups include non-conjugated aliphatic amines;
      wherein the anion conducting layer has a thickness of no more than 30 microns and that passively transports water from the anode side to the cathode side;
      wherein the anion conducting layer comprises a support material;
      wherein the anion conducting polymer is imbibed into the support material;
   b) a power source coupled to the anode and cathode to provide an electrical potential across the anode and the cathode to initiate reaction of oxygen and water on the cathode to produce hydroxide that is transported across the anion conducting layer and reacted on the anode to produce oxygen and water, thereby pumping oxygen from the cathode side to the anode side.

2. The electrochemical oxygen pump system of claim 1, wherein the anion conducting polymer comprises a backbone polymer selected from the group consisting of: polyether ketone, polystyrene, polyolefins, perfluoronated polyolefin, polyphenolene oxide, or polybiphenyl alkylene.

3. The electrochemical oxygen pump system of claim 1, wherein the anion conducting polymer has piperidine functional groups.

4. The electrochemical oxygen pump system of claim 1, wherein the anode and cathode are coated with gold or titanium nitride.

5. The electrochemical oxygen pump system of claim 1, wherein the electrochemical cell further comprises a cathode gas diffusion layer coupled with the cathode and an anode gas diffusion layer coupled with the anode.

6. The electrochemical oxygen pump system of claim 1, further comprising an anode flow field coupled to the anode and a cathode flow field coupled to the cathode.

7. The electrochemical oxygen pump system of claim 6, where the anode flow field is coated with gold or titanium nitride.

8. The electrochemical oxygen pump system of claim 1, wherein the anion conducting layer has a thickness of no more than 20 microns and that passively transports water from the anode side to the cathode side.

9. The electrochemical oxygen pump system of claim 8, wherein the support material is a porous fluoropolymer membrane.

10. The electrochemical oxygen pump system of claim 9, wherein the porous fluoropolymer membrane comprises expanded polytetrafluoroethylene.

\* \* \* \* \*